US010362259B2

United States Patent
Choi et al.

(10) Patent No.: US 10,362,259 B2
(45) Date of Patent: Jul. 23, 2019

(54) PORTABLE DEVICE, DISPLAY APPARATUS, DISPLAY SYSTEM, AND METHOD FOR CONTROLLING POWER OF DISPLAY APPARATUS THEREOF

(71) Applicant: SAMSUNG ELECTRONICS CO., LTD., Suwon-si (KR)

(72) Inventors: Eun-seok Choi, Anyang-si (KR); Mi-ra Yu, Seoul (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/621,592

(22) Filed: Jun. 13, 2017

(65) Prior Publication Data

US 2017/0280089 A1 Sep. 28, 2017

Related U.S. Application Data

(62) Division of application No. 14/329,288, filed on Jul. 11, 2014, now Pat. No. 9,706,153.

(30) Foreign Application Priority Data

Jul. 12, 2013 (KR) ........................ 10-2013-0082352
Jul. 2, 2014 (KR) ........................ 10-2014-0082545

(51) Int. Cl.
*H04N 5/44* (2011.01)
*G08C 17/02* (2006.01)
(Continued)

(52) U.S. Cl.
CPC ........... *H04N 5/4403* (2013.01); *G08C 17/02* (2013.01); *H04N 5/63* (2013.01); *H04N 21/4222* (2013.01);
(Continued)

(58) Field of Classification Search
CPC .. H04N 5/4403; H04N 5/63; H04N 21/42207; H04N 21/4222;
(Continued)

(56) References Cited

U.S. PATENT DOCUMENTS 6,346,891 B1  2/2002  Feinlieb et al.
9,226,021 B2  12/2015  Meng et al.
(Continued)

FOREIGN PATENT DOCUMENTS

CN  101795393 A  8/2010
CN  102130900 A  7/2011
(Continued)

OTHER PUBLICATIONS

Communication dated Jan. 12, 2017 issued by European Patent Office in counterpart European Application No. 14822603.8.
(Continued)

*Primary Examiner* — Orlando Bousono
(74) *Attorney, Agent, or Firm* — Sughrue Mion, PLLC

(57) ABSTRACT

A portable device, a display apparatus, a display system, and a method for controlling power of a display apparatus thereof are provided. The method includes sensing, while a portable device operates in a standby mode, a movement of the portable device using a motion sensor, converting, using the portable device, the standby mode of the portable device into a normal mode in response to the movement of the portable device being sensed, generating, using the portable device, a pre-power on signal in response to the standby mode being converted into the normal mode, transmitting the pre-power on signal to the display apparatus, and activating, by the display apparatus, some elements of the display apparatus in response to the pre-power on signal being received.

16 Claims, 12 Drawing Sheets

(51) Int. Cl.
  *H04N 5/63* (2006.01)
  *H04N 21/422* (2011.01)
  *H04N 21/443* (2011.01)
  *H04Q 9/00* (2006.01)
(52) U.S. Cl.
  CPC . *H04N 21/42207* (2013.01); *H04N 21/42222* (2013.01); *H04N 21/4436* (2013.01); *H04Q 9/00* (2013.01); *G08C 2201/12* (2013.01); *G08C 2201/32* (2013.01); *G08C 2201/93* (2013.01); *H04Q 2209/883* (2013.01)
(58) Field of Classification Search
  CPC .......... H04N 21/42222; H04N 21/4436; G06F 1/266; G06F 1/3203; G06F 1/3287; G06F 9/4418; G09G 2330/022; G09G 5/006; G08C 17/02; G08C 2201/12; G08C 2201/32; G08C 2201/93; H04Q 9/00; H04Q 2209/883
  See application file for complete search history.

(56) References Cited

U.S. PATENT DOCUMENTS

| | | | |
|---|---|---|---|
| 9,313,315 | B2 | 4/2016 | Choi et al. |
| 2005/0168372 | A1 | 8/2005 | Hollemans |
| 2007/0139569 | A1 | 6/2007 | Matsubayashi |
| 2008/0122825 | A1 | 5/2008 | Choi et al. |
| 2009/0041438 | A1 | 2/2009 | Kuno |
| 2009/0072992 | A1 | 3/2009 | Yun |
| 2009/0115752 | A1 | 5/2009 | Kim et al. |
| 2009/0122206 | A1 | 5/2009 | Jung |
| 2009/0128714 | A1 | 5/2009 | Taya |
| 2010/0079432 | A1 | 4/2010 | Kang et al. |
| 2010/0097030 | A1 | 4/2010 | Kim et al. |
| 2010/0229117 | A1 | 9/2010 | Lee et al. |
| 2011/0062794 | A1 | 3/2011 | Vergoossen et al. |
| 2011/0162014 | A1 | 6/2011 | Komori |
| 2011/0287753 | A1 | 11/2011 | Choi et al. |
| 2012/0042185 | A1 | 2/2012 | Lee et al. |
| 2012/0278603 | A1 | 11/2012 | Lee |
| 2012/0287603 | A1* | 11/2012 | Forant .................. F21V 17/10 362/89 |
| 2013/0023258 | A1 | 1/2013 | Choi et al. |
| 2013/0054945 | A1 | 2/2013 | Free et al. |
| 2013/0054986 | A1 | 2/2013 | Kim et al. |
| 2013/0113710 | A1 | 5/2013 | Choi et al. |
| 2014/0156269 | A1 | 6/2014 | Lee et al. |
| 2015/0015380 | A1 | 1/2015 | Choi et al. |
| 2015/0067743 | A1 | 3/2015 | Meng et al. |

FOREIGN PATENT DOCUMENTS

| | | |
|---|---|---|
| CN | 202178832 U | 3/2012 |
| CN | 102821015 A | 12/2012 |
| CN | 102891706 A | 1/2013 |
| CN | 102970611 A | 3/2013 |
| CN | 103106891 A | 5/2013 |
| EP | 2 592 544 A1 | 5/2013 |
| JP | 2008-219392 A | 9/2008 |
| KR | 10-2010-0124390 A | 11/2010 |
| KR | 10-2011-0126959 A | 11/2011 |
| RU | 2010 152 835 A | 7/2012 |

OTHER PUBLICATIONS

Search Report dated Nov. 10, 2014, issued by the International Searching Authority in counterpart International Application No. PCT/KR2014/006267.
Written Opinion dated Nov. 10, 2014, issued by the International Searching Authority in counterpart International Application No. PCT/KR2014/006267.
Communication dated Mar. 5, 2018, issued by the European Patent Office in counterpart European application No. 141822603.8.
Communication dated Mar. 12, 2018, issued by the State Intellectual Property Office of P.R. China in counterpart Chinese application No. 201480038942.7.
Communication dated Oct. 26, 2017, issued by the Russian Patent Office in counterpart Russian application No. 2016104518.
Communication issued by the European Patent Office dated Aug. 7, 2017 in counterpart European Patent Application No. 14 822 603.8.
Office Action dated Nov. 30, 2018 by the State Intellectual Property Office of P.R. China in counterpart Chinese Patent Application No. 201480038942.7.

* cited by examiner

PORTABLE DEVICE, DISPLAY APPARATUS, DISPLAY SYSTEM, AND METHOD FOR CONTROLLING POWER OF DISPLAY APPARATUS THEREOF

CROSS-REFERENCE TO RELATED APPLICATIONS

This is a Divisional of U.S. application Ser. No. 14/329,288 filed on Jul. 11, 2014, which claims priority from Korean Patent Application No. 10-2013-0082352, filed on Jul. 12, 2013, in the Korean Intellectual Property Office and Korean Patent Application No. 10-2014-0082545, filed on Jul. 2, 2014, in the Korean Intellectual Property Office, the disclosures of which are incorporated herein by reference in its entireties.

BACKGROUND

1. Field

Apparatuses and methods consistent with exemplary embodiments relate to a portable device, a display apparatus, a display system, and a method for controlling power of a display apparatus thereof, and more particularly, to a portable device, a display apparatus, a display system, and a method for controlling power of a display apparatus thereof, which can control power of the display apparatus using the portable device.

2. Description of the Related Art

Various display apparatuses such as a digital television (TV), etc. have undergone rapid development in all aspect of the device such as the addition and improvement of many features as well as the quality of the image and sound produced by the apparatuses. Further, the TV has evolved, from an analogue TV through which users simply view broadcasts, into a digital TV through which users view and enjoy various content. As the TV has evolved into the digital TV, a booting time that is required to display a digital broadcast or perform a smart function (for example, a web browsing function, etc.) after the TV has been turned on is somewhat prolonged in comparison with the responsiveness of the analogue TV For example, in the case of the digital TV, the booting time that is taken when the TV is initially turned on is a time that is required every time that the TV is turned on. The entirety of the booting time is preserved by a user as time taken prior to reaching the intended feature so any time taken for booting is not a short time as experienced by the user who wishes to watch the TV promptly. Although the booting time has become shorter in recent years as the processor has been improved and S/W technology has been developed, there is a hardware limit.

SUMMARY

According to an aspect of an exemplary embodiment, there is provided a method for controlling power of a display apparatus of a display system, the method includes sensing, while a portable device operates in a standby mode, a movement of the portable device using a motion sensor, converting, using the portable device, the standby mode of the portable device into a normal mode in response to the movement of the portable device being sensed, generating, using the portable device, a pre-power on signal in response to the standby mode being converted into the normal mode, transmitting the pre-power on signal to the display apparatus, and activating, by the display apparatus, some elements of the display apparatus in response to the pre-power on signal being received.

The method may further include generating a power-on signal using the portable device, transmitting the power-on signal to the display apparatus in response to inputting of a user command configured to select a preset button of the portable device, and activating, by the display apparatus, some additional elements of the display apparatus in response to the power on signal being received.

The standby mode may be configured such that the motion sensor of the portable device is maintained in an activated state, and a controller and a communicator of the portable device are maintained in an inactivated state.

The converting may include generating, using the motion sensor, an interrupt signal in response to the movement of the portable device being sensed, transmitting, using the motion sensor, the interrupt signal to the controller and the communicator, and activating the controller and the communicator into the activated state based on the interrupt signal.

The transmitting may include transmitting, using the communicator, a communication connection request signal to the display apparatus after the mode of the portable device is changed into the normal mode, performing, using the communicator, communication connection with the display apparatus in response to a signal responding to the communication connection request signal being received from the display apparatus, generating, using the controller, the pre-power on signal and outputting the pre-power on signal to the communicator, and transmitting, using the communicator, the pre-power on signal to the display apparatus.

Transmitting, using the communicator, of the pre-power on signal to the display apparatus may use at least one of Bluetooth communication method, ZigBee communication method, and Wi-Fi communication method.

The transmitting may include transmitting, by the communicator, a communication connection request signal to the display apparatus as the pre-power on signal after the standby mode of the portable device is converted to the normal mode.

The method may further include converting, using the display apparatus, the normal mode of the display apparatus to the standby mode in response to a power on signal not being received while the pre-power on mode activating some elements is maintained by the display apparatus.

The method may further include deactivating the pre-power on function of the display apparatus in response to the display apparatus being converted from the pre-power on mode to the standby mode for a preset number of times.

The method may further include outputting an indicator that one of the display apparatus or the portable device is in the pre-power on mode in response to the pre-power on mode that activates some elements being maintained.

According to an aspect of another exemplary embodiment, there is provided a display system, including a display apparatus, and a portable device configured to sense a movement of the portable device while the display apparatus operates in a standby mode, convert the standby mode of the display apparatus into a normal mode, generate a pre-power on signal to activate some elements of the display apparatus, and transmit the generated pre-power on signal to the display apparatus.

The portable device may be further configured to generate a power on signal and transmit the power on signal to the display apparatus in response to input of a user command to select a preset button of the portable device, wherein the display apparatus activates all the elements of the display apparatus in response to the power on signal being received.

The standby mode may be configured such that the motion sensor of the portable device is maintained in an activated state, and a controller and a communicator of the portable device are maintained in an inactivated state.

The portable device may be further configured to generate, using the motion sensor, an interrupt signal in response to a movement of the portable device being sensed, transmit, using the motion sensor, the interrupt signal to the controller and the communicator, and activate the controller and the communicator.

The portable device may be further configured to transmit, using the communicator, a communication connection request signal to the display apparatus, after the mode of the portable device is converted into the normal mode, perform, using the communicator, communication connection with the display apparatus in response to a signal responding to the communication connection request signal being received from the display apparatus, generate, using the controller, the pre-power on signal and outputting the pre-power on signal to the communicator, and transmit, using the communicator, the pre-power on signal to the display apparatus.

The portable device may be further configured to transmit the pre-power on signal to the display apparatus using at least one of Bluetooth communication method, ZigBee communication method, and Wi-Fi communication method.

The portable device may be further configured to transmit, using the communicator, a communication connection request signal to the display apparatus as the pre-power on signal after the standby mode of the portable device is converted to a normal mode.

The display apparatus may be configured to convert, by the display apparatus, the normal mode of the display apparatus to the standby mode in response to a power on signal not being received while the pre-power on mode activating some elements is maintained by the display apparatus.

The display apparatus may be further configured to be converted from the pre-power on mode to the standby mode for a preset number of times, wherein the pre-power on function of the display apparatus is inactivated.

The display apparatus may be configured to output an indicator that one of the display apparatus of the portable device is in the pre-power on mode in response to the pre-power on mode that activates some elements being maintained.

According to an aspect of another exemplary embodiment, there is provided a portable device including a sensor configured to sense a movement of the portable device while the portable device operates in a standby mode, and convert a mode of the portable device into a normal mode, a controller configured to generate a pre-power on signal to activate some elements of the display apparatus is response to the sensor sensing the movement of the portable device and the standby mode being converted into the normal mode, and a communicator configured to transmit the generated pre-power on signal to the display apparatus, wherein the portable device is a remote controller.

According to an aspect of another exemplary embodiment, there is provided a display apparatus including a communicator configured to connect with a remote controller for communication in response the display apparatus receiving a communication connection request signal from a remote controller while maintaining a standby mode, a display, and a controller configured to convert a mode into a pre-power on mode to activate some elements of the display apparatus in response to a pre-power on signal being received from the remote controller through the communicator, and convert the pre-power on mode into a normal mode to activate the other elements of the display apparatus in response to the display apparatus receiving a power on signal from the remote controller while maintaining the pre-power on mode.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
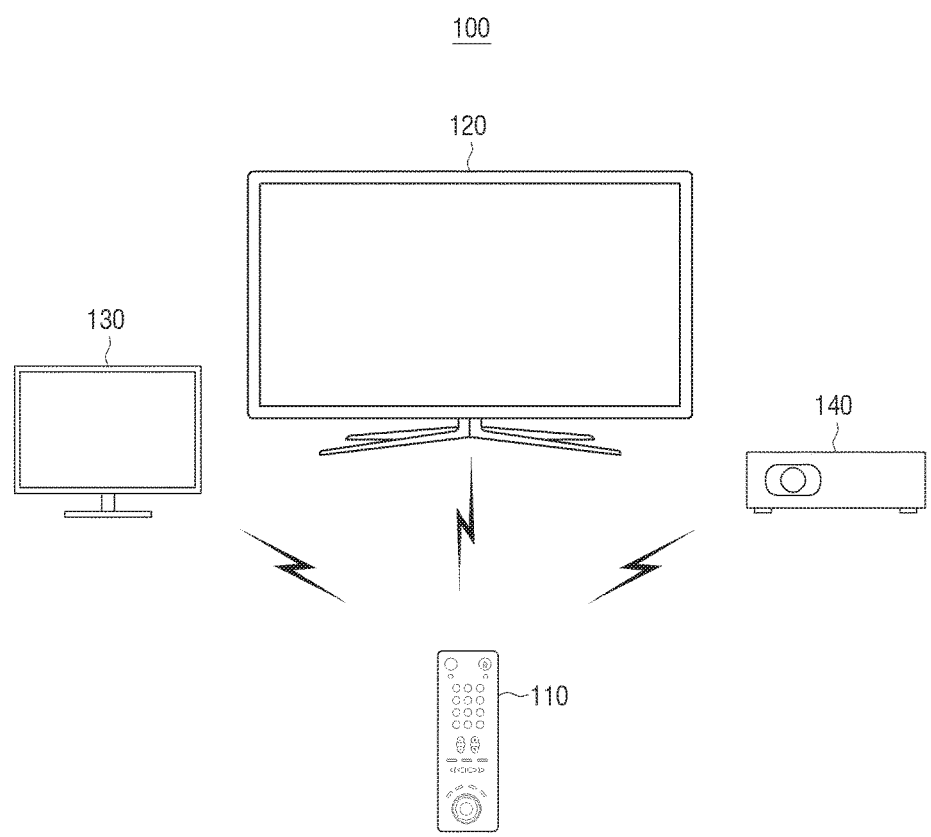
FIG. 1 is a view illustrating a display system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail because they would obscure the exemplary embodiments with unnecessary detail.

FIG. 1 is a view illustrating a configuration of a display system 100 according to an exemplary embodiment. As shown in FIG. 1, the display system 100 includes a portable device 110 and a display apparatus 200. The portable device 110 may be a general remote controller for controlling a TV. However, this is merely an example. The portable device 110 may be a portable terminal such as a smartphone, a tablet PC, a key fob, a gaming pad, etc. Also, the display apparatus 120 may be a digital TV. However, this is merely an example. The display apparatus 120 may be an electronic apparatus such as a set-top box, a projection TV, a desktop PC, a tablet PC, a smart phone, etc.

Further, the display system 100 may include more than one display device, particularly, the display system 100 may also include a computer monitor 130 which is configured to also communicate with the remote controller 110. The display system 100 may also include a projector 140 that is configured to communicate with the remote controller as well.

When it is determined that there is no movement of the portable device 100, the portable device 110 may convert a mode of one or both of the remote controller 110 and the display apparatus 120 into a standby mode. Specifically, the portable device 110 may determine whether there is movement using a sensor, for example, a motion sensor, which is provided in or on the portable device 110. Accordingly, when there is no movement in the portable device 110 for a predetermined time, the portable device 110 may convert the mode of the display apparatus 120 into the standby mode. The standby mode may be a mode in which elements, other than the motion sensor for sensing the movement of the portable device 110, are transitioned to, or maintained in, an inactivated state.

During a time when the portable device 110 is maintaining the standby mode, the portable device 110 may sense movement of the portable device 110 using the motion sensor.

When the movement of the portable device 110 is sensed, the portable device 110 may convert the mode from the standby mode into a normal mode. Specifically, when the portable device 110 senses its own movement through the motion sensor, the motion sensor of the portable device 110 may generate an interrupt signal, and may output the interrupt signal to the other elements (for example, a controller, a communicator, etc.) of the portable device 100, thereby activating the other elements of the portable device 110.

When the movement of the portable device 110 is sensed and the mode is converted into the normal mode, the portable device 110 may generate a pre-power on signal and transmit the pre-power on signal to the external display apparatus 120. The pre-power on signal is a signal configured to activate some elements (for example, a controller, etc.) of the display apparatus 120 before the entire display apparatus 120 is powered on. Also, the portable device 110 may transmit the pre-power on signal to the display apparatus 120 using a communication method other than an infrared ray (IR) communication method.

Specifically, the portable device 110 may transmit the pre-power on signal to the display apparatus 120 by using Bluetooth communication. In addition, the portable device 110 may transmit a communication connection request signal to connect communication with the display apparatus 120 to the display apparatus 120 as a pre-power on signal.

When the pre-power on signal is received, the display apparatus 120 may determine whether that the display apparatus 120 is in a standby mode or a normal mode. The standby mode is a mode in which elements other than a communicator of the display apparatus 120 are inactivated, and the normal mode is a mode in which all of the elements of the display apparatus 120 are activated.

When the display apparatus 120 is in the normal mode, the display apparatus 120 may disregard the pre-power on signal. However, when the display apparatus 120 is in the standby mode, the display apparatus 120 may convert the mode of the display apparatus 120 from the standby mode into a pre-power on mode. The pre-power on mode is a mode in which some elements (for example, the controller) for driving the display apparatus 120 are activated. When the display apparatus 120 enters the pre-power on mode, the display apparatus 120 may also start to track the amount of time that transpires.

While the display apparatus 120 maintains the pre-power on mode, the portable device 110 may determine whether a user command to select a power on button is input. When the power on button is selected, the portable device 110 may generate a power on signal and may transmit the power on signal to the display apparatus 120. However, when the power on button is not selected and no movement is sensed for a predetermined time, the portable device 110 may return to the standby mode. Similarly, the display apparatus 120 may return to the standby mode as well after a predetermined time transpires without any further signaling from the remote controller 110.

Alternatively, when the power on signal is received from the portable device 110 within a predetermined time while the display apparatus 120 maintains the pre-power on mode, the display apparatus 120 may convert the mode of the display apparatus 120 from the pre-power on mode into the normal mode. That is, the display apparatus 120 may activate the other elements of the display apparatus 200, such as a display and an audio outputter.

When the power on signal is not received from the portable device 110 within the predetermined time while the display apparatus 120 maintains the pre-power on mode, the display apparatus 120 may convert the mode of the display apparatus 120 from the pre-power on mode into the standby mode.

As described above, because some elements of the display apparatus 120 are activated and booted the moment that the user moves the portable device 110, the user may perceive that the display apparatus 120 is able to boot more quickly than the related-art display apparatus, which is booted when the user selects the power on button of the portable device 110.

Figure 2:
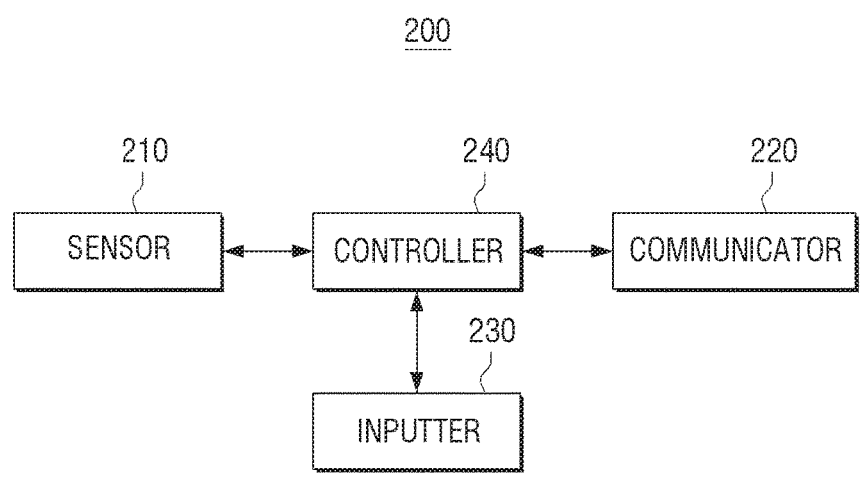
FIG. 2 is a block diagram illustrating a configuration of a portable device according to an exemplary embodiment.

Hereinafter, according to an exemplary embodiment, a portable device will be explained in detail with reference to FIG. 2. As shown in FIG. 2, the portable device 200 includes a sensor 210, a communicator 220, an inputter 230, and a controller 240. As described above, the portable device 200 may be a general portable device 200 only for controlling a digital TV. However, this is an example and the portable device 200 which may be implemented in many different ways such as by using a portable terminal such as a smartphone, a tablet PC, a personal digital assistant (PDA), etc.

FIG. 2 illustrates various elements of the portable device 200 as an example of an apparatus equipped with a display apparatus control function. Accordingly, some of the elements shown in FIG. 2 may be omitted or changed, and another element may be further included. For example, when the portable device 200 is implemented by using a smartphone, elements like a display and an audio outputter may be added.

The sensor 210 may sense a user's motion using at least one motion sensor. The motion sensor may be implemented by using a plurality of motion sensors such as acceleration sensors, geomagnetic sensors, or gyro sensors.

In particular, although the sensor 210 includes the plurality of motion sensors, the sensor 210 may determine the movement of the portable device 200 using one motion sensor (for example, an acceleration sensor) in order to minimize power consumption while the portable device 200 maintains the standby mode.

Further, while the portable device 200 is in the standby mode, the sensor 210 may be activated at intervals of a particular time, senses the movement for a set time, and then it may be inactivated. The sensor 210 may then repeat these operations during the time in which the remote controller 210 is in the standby mode. The sensor 210 may sense the movement at a lower frequency while in the standby mode as compared to the normal mode such that power consumption can be reduced.

When a sensed movement of the portable device 200 is larger than a predetermined value, and the portable device 200 is in the standby mode, the sensor 210 may convert the mode of the portable device 200 from the standby mode into the normal mode. Specifically, the sensor 210 generates an interrupt signal, outputs the interrupt signal to the inactivated controller 240 and the communicator 220 and activates the controller 240 and the communicator 220

The sensor 210 may generate the interrupt signal and output the interrupt signal to the controller 240 and the communicator 220, respectively. This is an example and the sensor 210 may alternatively output the interrupt signal only to the controller 240. The controller 240 may be activated by the interrupt signal and may transmit the interrupt signal to the other elements (for example, the communicator 220, etc.).

When the movement of the portable device 200 is sensed while the portable device 200 maintains the normal mode, the sensor 210 may transmit a data value corresponding to the movement of the portable device 200 to the controller 240.

Alternatively, according to one or more exemplary embodiments, the sensor may be, or include, a camera, a microphone, a near field communication sensor, a global positioning system (GPS) sensor, or some combination of sensors thereof. Accordingly, the portable device may have a pre-selection or selection event that corresponds to any one of a motion, a particular image such as a gesture, a sound such as a vocal command, a near touch, a particular location, a particular programmed time, or some combination thereof. The pre-selection event, when triggered, may cause the portable device to activate and generate the pre-power on signal. The selection event, when triggered, may cause the portable device to activate and generate the power on signal.

Similarly, other sensor types could also be envisioned wherein the sensor input, once detected, is configured to trigger the state change in the portable device which in turn may trigger the state change in the display apparatus from any one of a standby mode (or state) that corresponds to a passing of an certain amount of idle sensor time, a pre-power on mode (or state) that corresponds to a pre-power on signal, and a normal mode (or state) that corresponds to a power on signal.

The communicator 220 may communicate with the external display apparatus. Further, the communicator 220 may communicate with the display apparatus using a wireless communication such as IR communication, ZigBee communication, Bluetooth communication, and Wi-Fi.

Also, the communicator 220 may transmit the pre-power on signal and the power on signal to the display apparatus. In this case, the communicator 220 may transmit a pre-power on signal to the display apparatus using a communication method other than the IR method.

In addition, the communicator 220 may transmit to the display apparatus a control signal corresponding to a user command input through the inputter 230 using the IR communication method or another communication method.

That is, the communicator 220 may transmit a control signal, a pre-power on signal, and a power on signal using the same communication method, but this is merely exemplary, and may transmit the control signal, the pre-power on signal, and the power on signal corresponding to a user command using another communication method. For example, the communicator 220 may transmit the pre-power on signal and the power on signal to the display apparatus using the Bluetooth communication method, and the control signal corresponding to a user command to the display apparatus using the IR communication method.

However, the above-described exemplary embodiments describe that, when communication is performed with the display apparatus using the Bluetooth communication method, the controller 240 generates the pre-power on signal to convert a mode of the display apparatus to the pre-power on mode, but this is merely exemplary. Communication connection request signal may perform a role as the pre-power on signal. That is, when receiving a communication connection request from the portable device 200, the display apparatus may not only transmit the communication connection responding signal, but also convert the standby mode to the pre-power on mode.

Also, the communicator 220 may be maintained in the inactivated state while the portable device 200 maintains the standby mode and may be activated when receiving the interrupt signal through the sensor 210.

In the above-described exemplary embodiment, the pre-power on signal is generated by the controller 240. However, this is merely an example, and, when the communicator 220 is activated by the interrupt signal, the communicator 220 may generate the pre-power on signal and may transmit the pre-power on signal to the display apparatus.

The inputter 230 may receive a user command to control the display apparatus. The inputter 230 may be implemented by using a plurality of buttons or a touch screen. According to an exemplary embodiment, the inputter 230 may include a power on button to turn on the power of the display apparatus.

When a user command is input through the inputter 230, the controller 240 may generate a control signal corresponding to the input user command and may transmit the control signal to the display apparatus through the communicator 220.

In particular, while the portable device 200 remains in the standby mode, the controller 240 may be maintained in the inactivated state. Also, when the interrupt signal is received by the sensor 210 while the portable device 200 remains in the standby mode, the controller 240 may be activated. Also, the controller 240 may generate the pre-power on signal to activate some of the elements of the display apparatus and may transmit the pre-power on signal to the communicator 220 to transmit the pre-power on signal to the display apparatus.

In this case, in order to transmit the pre-power on signal to the display apparatus using a communication method which requires communication connection such as Bluetooth communication method or ZigBee communication method, the controller 240 may generate the pre-power on signal after the communicator 220 is connected with the display apparatus for communication, and may output the pre-power on signal to the communicator 220.

When a user command (for example, a user command to select the power on button) is input through the inputter 230 while the display apparatus maintains the pre-power on mode, the controller 240 may generate the power on signal to activate all of the elements of the display apparatus 200 and may control the communicator 220 to transmit the power on signal to the display apparatus.

Further, when the movement of the portable device 200 is not sensed by the sensor 210 within a predetermined time while the display apparatus 200 maintains the pre-power on mode, the controller 240 may change the mode of the portable device 200 into the standby mode and may inactivate the portable device 200.

When the movement is sensed while the portable device 200 is in the standby mode, the controller 240 generates the pre-power on signal. When the movement of the remote controller is sensed while the portable device 200 is in the normal mode (for example, while there is no movement in the portable device 200 but the portable device 200 is in the normal mode), the controller 240 may generate the pre-power on signal.

The portable device 200 may transmit the pre-power on signal to the display apparatus 200 to boot the display apparatus the moment that the user holds the portable device 200. Therefore, the display apparatus may be booted when the user holds the portable device 200 rather than when the user presses the power on button of the portable device 200. Also, when the power on signal is received while the display apparatus maintains the pre-power on mode, the display apparatus may directly display a broadcast channel or perform a smart function. Accordingly, the user may feel that the time required to boot the display apparatus is shortened.

Hereinafter, a display apparatus will be explained in detail with reference to FIGS. 3 to 5c.

Figure 3:
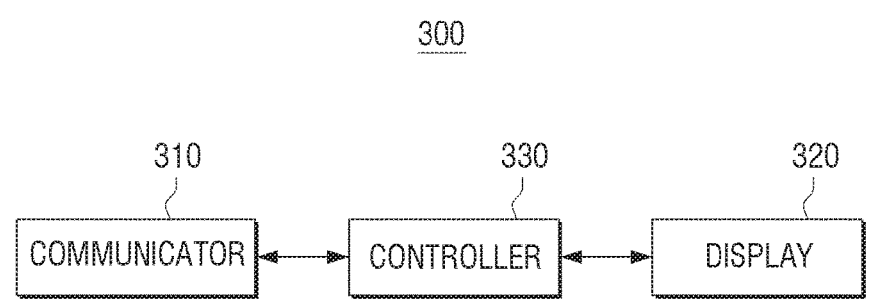
FIGS. 3 and 4 are block diagrams illustrating a configurations of a display apparatus according to one or more exemplary embodiments.

FIG. 3 is a block diagram schematically illustrating a configuration of the display apparatus 300 according to an exemplary embodiment. As shown in FIG. 3, the display apparatus 300 includes a communicator 310, a display 320, and a controller 330.

The communicator 310 may communicate with the portable device. In particular, the communicator 310 may receive a control signal corresponding to a user command from the portable device. Also, the communicator 310 may receive a pre-power on signal or a power on signal from the portable device.

The communicator 310 may communicate with the remote controller in various wireless communication methods. Specifically, the communicator 310 may communicate with the portable device using a wireless communication method such as an IR communication method, a Zigbee communication method, a Bluetooth communication method, and a Wi-Fi communication method.

The communicator 310 may be activated even when the display apparatus 300 remains in the standby mode and may receive the pre-power on signal or a communication connection request signal from a portable device.

The display 320 may display image data under the control of the controller 330. In particular, the display 320 is inactivated while the display apparatus 300 is in the standby mode and the pre-power on mode, and may then be activated when the mode of the display apparatus 300 is transitioned into the normal mode.

The controller 330 may control an overall operation of the display apparatus 300 according to a user command received through the portable device. Further, the controller 330 may be inactivated while the display apparatus 300 is in the standby mode.

When the pre-power on signal is received from the portable device by the communicator 310 while the display apparatus 300 is in the standby mode, the controller 330 may change the mode into a pre-power on mode to activate some elements of the display apparatus. Specifically, when the pre-power on signal is received, the controller 330 may be activated and the mode of the display apparatus 300 may be changed to the pre-power on mode. In this case, the pre-power on signal may be transmitted using a communication method other than the IR communication method.

When the power on signal is received from the portable device within a predetermined time while the display apparatus 300 maintains the pre-power on mode, the controller 330 may change the mode of the display apparatus 300 to the normal mode in order to activate the other elements of the display apparatus 300. Specifically, when the power on signal is received from the portable device within the predetermined time while the display apparatus 300 maintains the pre-power on mode, the controller 330 may activate a data output configuration such as the display 320 and may change the mode to the normal mode.

However, when the power on signal is not received within the predetermined time while the display apparatus 300 maintains the pre-power on mode, the controller 330 may change the mode of the display apparatus 300 to the standby mode.

Also, when conversion from the pre-power on mode into the standby mode is repeated a predetermined number of times, the controller 330 may inactivate the pre-power on function of the display apparatus 300 in order to prevent unnecessary power consumption.

Figure 4:
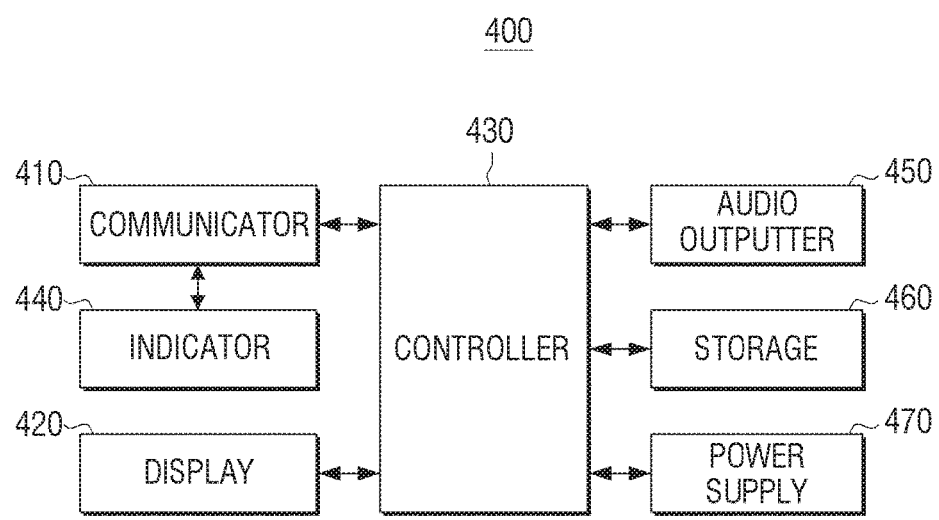

FIG. 4 is a block diagram illustrating the configuration of a display apparatus 400 in detail according to an exemplary embodiment. As shown in FIG. 4, the display apparatus 400 includes a communicator 410, an indicator 440, a display 420, an audio outputter 450, storage 460, a power supply 470, and a controller 430.

FIG. 4 illustrates various elements of the display apparatus 400 as an example of an apparatus equipped with a content providing function and a display function. Accordingly, some of the elements shown in FIG. 4 may be omitted or changed and another element may be further included.

The communicator 410 communicates with a portable device. In particular, the communicator 410 may communicate with the portable device using an IR communication method, and may specifically communicate with the portable device using various wireless communication methods, such as a Bluetooth communication method, a Wi-Fi communication method, and a Zigbee communication method.

In the Bluetooth communication method and the Wi-Fi communication method, the communicator 410 may communicate with the portable device using a Bluetooth chip and a Wi-Fi chip, respectively. When the Wi-Fi chip or Bluetooth chip is used, a variety of connection information such as an SSID and a session key may be exchanged first and a variety of information may be additionally exchanged after communication is established using the connection information. The wireless communication method may include the use of various communication methods such as IEEE, $3^{rd}$ Generation (3G), $3^{rd}$ generation partnership project (3GPP), and long term evolution (LTE).

While the display apparatus 400 maintains the standby mode, the communicator 410 may receive the communication connection request signal from the portable device. Also, the communicator 410 may transmit the communication connection response signal and may communicate with the portable device. On the other hand, in the above-described exemplary embodiment, the display apparatus 400 performs a pairing operation with the portable device beforehand. When the display apparatus 400 has not performed the pairing operation with the portable device, the communicator 410 may performs the pairing operation with the portable device. In this case, the pairing operation indicates operation that the portable device and the display apparatus 400 register each other's communication information (for example, ID information, password information, MAC address information). Accordingly, when communication information is registered through the pairing operation, the communicator 410 may perform communication using pre-registered communication information without a separate registration process.

Figure 5A:
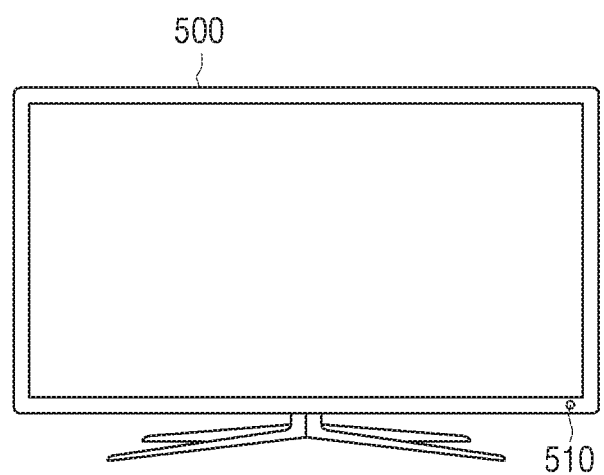
FIGS. 5a-5c are views of various indicators that guide a pre-power on mode according to one or more exemplary embodiments.
Figure 5B:
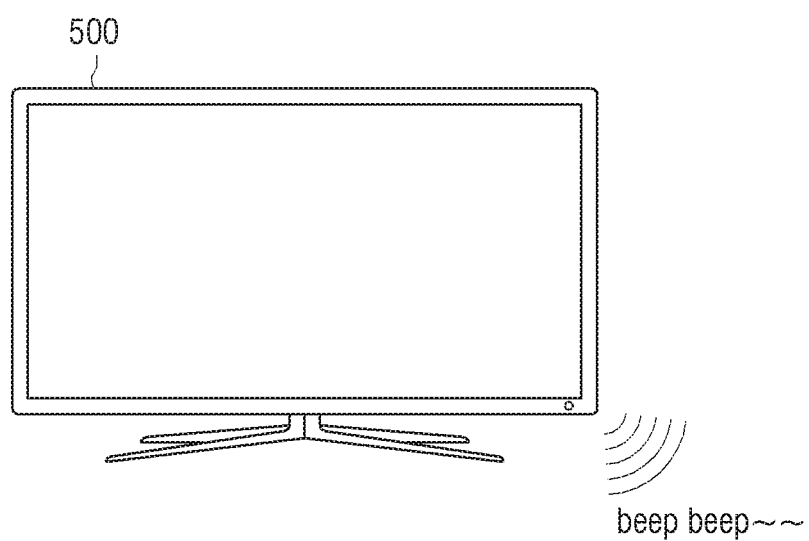

The indicator 440 indicates that the display apparatus 400 is in the pre-power on mode. Specifically, when the pre-power on signal is received through the communicator 410 while the display apparatus 400 remain in the standby mode, the indicator 440 may output an indicator informing that the display apparatus 400 is in the pre-power on mode. For example, an indicator, as illustrated in FIG. 5*a*, may be implemented by using a light emitting diode (LED) element included in a bezel area of the display apparatus 500. According to another example, an indicator, as illustrated in FIG. 5*b*, may be implemented by using an audio output configuration which outputs a specific beep sound.

Figure 5C:
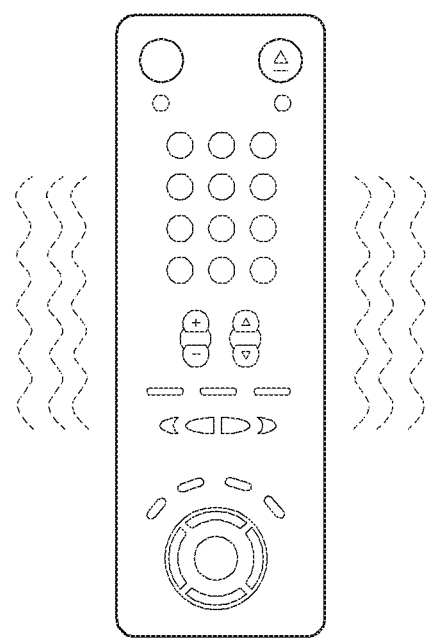

In another exemplary embodiment, the indicator 440 of the display apparatus 400 outputs an indicator which guides the pre-power on mode. Alternatively, the portable device can also output an indicator which guides the pre-mode. For example, when entering the pre-power on mode, the portable device may generate vibration, as illustrated in FIG. 5*c*, with an indicator which guides the pre-power on mode.

The display 420 outputs image data under the control of the controller 430. In particular, the display 420 may be inactivated while the display apparatus 400 remains in the standby mode or the pre-power on mode, and receives power from the power supply 470 and is activated when the mode of the display apparatus is changed to the normal mode.

The audio outputter 450 outputs audio data under the control of the controller 430. Like the display 420, the audio outputter 450 may be inactivated while the display apparatus 400 is in the standby mode or the pre-power on mode, and receives power from the power supply 470 and is activated when the mode of the display apparatus 400 is changed to the normal mode.

The storage 460 may store various modules for driving the display apparatus 400. For example, the storage 460 may store software including a base module, a sensing module, a communication module, a presentation module, a web browser module, and a service module. The base module is a module that may process signals transmitted from each hardware element that is included in the display apparatus 400, and may transmit the signals to an upper layer module. The sensing module is a module that may collect information from various sensors, and analyze and manage the collected information, and may include a face recognition module, a voice recognition module, a motion recognition module, and a near field communication (NFC) recognition module. The presentation module is a module that may generate a display screen, and may include a multimedia module to reproduce and output multimedia content, and a UI rendering module to process a UI and graphics. The communication module is a module for communicating with an external apparatus. The web browser module is a module that may perform web browsing and may access a web server. The service module is a module that may include various applications for providing various services.

As described above, the storage 460 may include various program modules. However, some of the program modules may be omitted or changed or another program module may be added according to the kind and characteristic of the display apparatus 400.

The power supply 470 may supply power received from an external source to the elements of the display apparatus 400 under the control of the controller 430. In particular, when the display apparatus 400 is in the standby mode, the power supply 470 supplies power only to the communicator 410, and, when the display apparatus 400 is in the pre-power on mode, the power supply 470 supplies power to the communicator 410, the indicator 440, the controller 430, and the storage 460. Further, when the display apparatus 400 is in the normal mode, the power supply 470 may supply power to all of the elements of the display apparatus 400.

The controller 430 may control an overall operation of the display apparatus 400 according to a user command input through the portable device. Further, while the display apparatus 400 remain in the standby mode, the controller 430 may not receive power from the power supply 470 and thus is maintained in the inactivated state.

When the pre-power on signal is received from the portable device while the display apparatus 400 is in the standby mode, the controller 430 may receive power from the power supply 470 and thus it may be activated.

When the display apparatus 400 communicates with the portable device using the Bluetooth communication method, the controller 430 may be connected with the portable device for communication and then may receive the pre-power on signal through the communicator 410.

When the pre-power on signal is received from the portable device and the controller 430 is activated, the controller 430 counts a time. That is, when the mode of the display apparatus 400 is converted into the pre-power on mode, the controller 430 may count the time.

When the power on signal is received within a predetermined time and the display apparatus 400 remains in the pre-power on mode, the controller 430 may change the mode of the display apparatus 400 into the normal mode in order to activate the other elements of the display apparatus 400. Specifically, when the power on signal is received from the portable device within the predetermined time while the display apparatus 400 maintains the pre-power on mode, the controller 430 may control the power supply 470 to activate the other elements like the display 420 and the audio outputter 450.

However, when the power on signal is not received within the predetermined time when the display apparatus 400 is in the pre-power on mode, the controller 430 may change the mode of the display apparatus 400 into the standby mode. That is, the controller 430 controls the power supply 470 to inactivate the controller 430, the indicator 440, and the storage 460.

When the display apparatus 400 is converted from the pre-power on mode into the standby mode rather than into the normal mode, the controller 430 may count a number of times that the display apparatus 400 is converted from the pre-power on mode into the standby mode.

When the number of times that the pre-power on mode is converted into the standby mode is greater than a predetermined number, the controller 430 may determine that the user moves the portable device with a different intention other than the intention of controlling the display apparatus 400, and may inactivate the pre-power on function of the display apparatus 400 in order to prevent unnecessary power consumption. That is, when conversion from the pre-power on mode into the standby mode is repeated a predetermined number of times, the controller 430 may maintain the standby mode instead of converting the mode of the display apparatus 400 into the pre-power on mode even when the pre-power on signal is received in the standby mode. In this case, in order to turn on power of the display apparatus 400, the user should select the power on button.

However, when the power on signal is received, the controller 430 may activate the inactivated pre-power on function again.

On the other hand, when the display apparatus 400 is in the normal mode and the pre-power on signal is received from the portable device, the controller 430 may disregard the pre-power on signal received from the portable device and may maintain the normal mode.

As described above, simply by holding the remote controller prior to pressing the power on button, the user can have some elements of the display apparatus 400 activated and have the display apparatus booted, such that the user can feel that the display apparatus 400 is booted more quickly.

FIG. 5A is a view that illustrates an indicator 510 of a display apparatus 500 according to an exemplary embodiment. FIG. 5B is a view that illustrates an indicator emitting a "beep beep~ ~" indicator sound from the display apparatus 500.

Hereinafter, a method for controlling power of a display apparatus according to various exemplary embodiments will be explained with reference to FIGS. 6 to 10.

Figure 6:
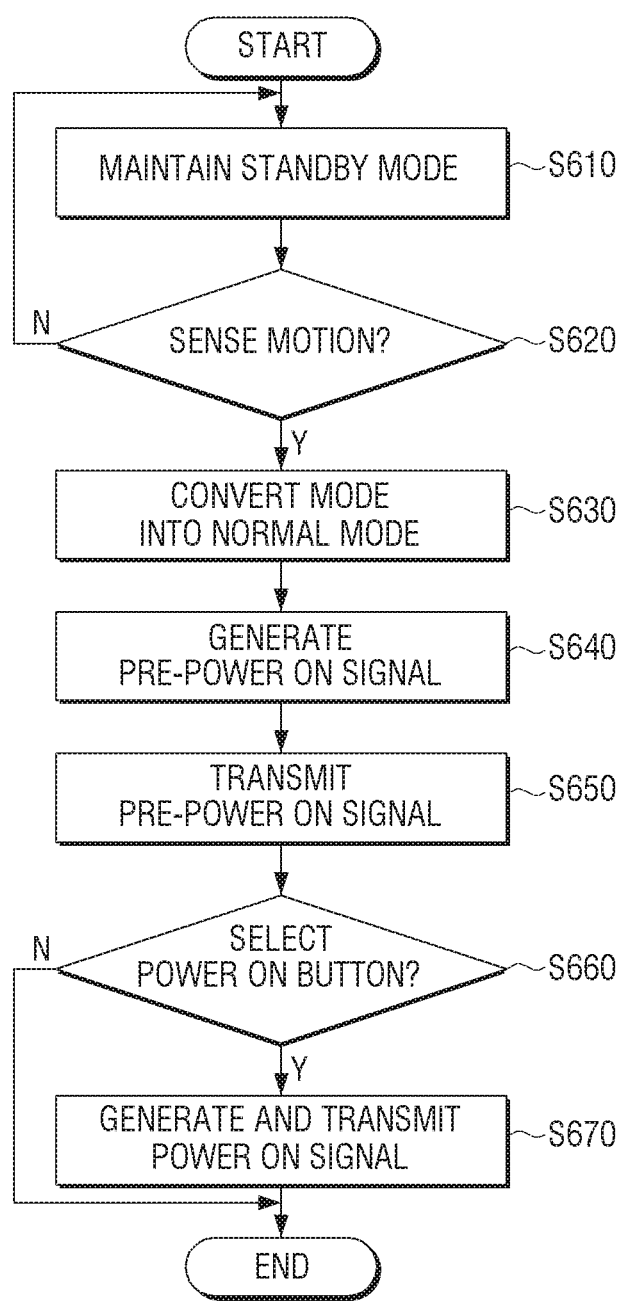
FIG. 6 is a flowchart illustrating a method for controlling power of a display apparatus of a portable device according to an exemplary embodiment.

FIG. 6 is a flowchart to illustrate a method for controlling power of a display apparatus of a portable device according to an exemplary embodiment.

First, the portable device maintains a standby mode (S610). Specifically, when there is no movement in the portable device for a predetermined time, the portable device enters the standby mode and maintains the standby mode. The standby mode of the remote controller refers to a state in which only a motion sensor is activated and the other elements are inactivated.

While maintaining the standby mode, the portable device senses a movement of the portable device (S620). Specifically, the portable device may sense the movement of the portable device using at least one of a plurality of motion sensors.

When the movement of the portable device is sensed (S620-Y), the portable device converts the mode into a normal mode (S630). Specifically, when movement of the portable device is sensed, the motion sensor of the portable device may generate an interrupt signal and may output the interrupt signal to the other elements of the portable device, for example, a controller and a communicator. Also, when the other elements of the portable device receive the interrupt signal, the other elements of the portable device may be activated and the mode of the portable device is converted into the normal mode.

The portable device generates a pre-power on signal (S640). At this time, the pre-power on signal may be a signal for activating some elements (for example, a controller, etc.) of a display apparatus and converting a mode of the display apparatus into a pre-power on mode. However, the portable device, in order to transmit the pre-power on signal, may communicate with the display apparatus before transmitting the pre-power on signal.

The portable device transmits the generated pre-power on signal to the display apparatus (S650). When the pre-power on signal is received, the display apparatus may convert the mode of the display apparatus from a standby mode into a pre-power on mode. When the display apparatus maintains a normal mode and receives the pre-power on signal, the display apparatus still maintains the normal mode without converting the mode into the pre-power on mode.

The portable device determines whether a power on button is selected or not (S660). The power on button may be a button for receiving a user command to convert the mode of the display apparatus into the normal mode.

When the power on button is selected (S660-Y), the portable device generates a power on signal and transmits the power on signal to the display apparatus (S670). When the power on signal is received while the display apparatus is in the pre-power on mode, the display apparatus may activate the other elements and change the mode into the normal mode.

Figure 7:
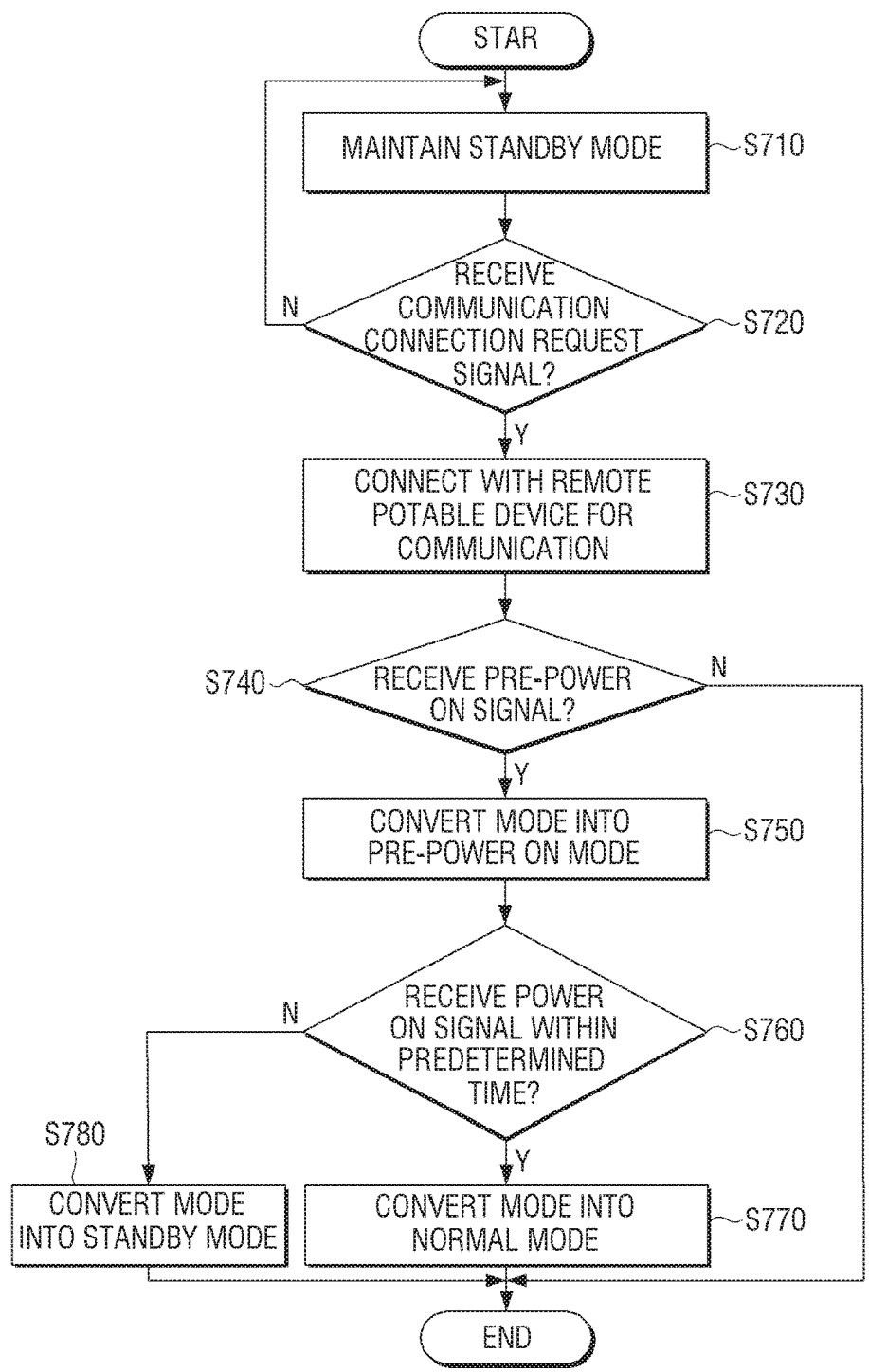
FIG. 7 is a flowchart illustrating a method for controlling power of a display apparatus according to an exemplary embodiment.

FIG. 7 is a flowchart that illustrates a method for controlling power of a display apparatus according to an exemplary embodiment.

First, the display apparatus maintains a standby mode (S710). The standby mode of the display apparatus is a mode in which the display apparatus is connected to a power supply apparatus but elements other than a communicator are inactivated.

While the display apparatus is in the standby mode, the display apparatus may determine whether a communication connection request signal is received (S720). For example, when the display apparatus communicates with the portable device using a Bluetooth communication method or ZigBee communication method, the display apparatus may receive the communication connection request signal from the portable device.

When the communication connection request signal is received (S720-Y), the display apparatus is connected with the portable device for communication (S730). Specifically, when the communication connection request signal is received from the portable device (S720-Y), the display apparatus transmits a communication connection response signal and is connected with the portable device for communication.

The display apparatus determines whether a pre-power on signal is received from the portable device (S740).

When the pre-power on signal is received (S740-Y), the display apparatus converts the mode of the display apparatus into a pre-power on mode (S750). The pre-power on mode is a mode in which some elements of the display apparatus (for example, a controller, an indicator, a storage, etc.) are activated. When the mode is converted into the pre-power on mode, the display apparatus may output an indicator (for example, a flickering LED provided on a bezel as shown in FIGS. 5A and 5B) informing that the current mode of the display apparatus is the pre-power on mode.

According to an exemplary embodiment, when the display apparatus is a projector, a lamp within the projector which requires substantial time to warm up for use, may be an included element that is activated when the pre-power on mode is entered. Additionally, according to another exemplary embodiment, the portable device may activate the lamp before a motion is detected and therefore may start warming up the lamp even before the pre-power on mode is entered. For example, the portable device may detected that the user has made a motion, has entered the room, had provided a vocal command, or has come near the portable device, any of which may indicate that the lamp should be activated. Then, when the portable device detects a motion and/or a button input, the portable device may proceed with entering a different mode from standby as described.

Also, the display apparatus determines whether a power on signal is received from the portable device within a predetermined time (S760).

When the power on signal is received within the predetermined time (S760-Y), the display apparatus converts the mode of the display apparatus into a normal mode (S770). The normal mode is a mode in which all of the elements of the display apparatus are activated.

However, when the power on signal is not received within the predetermined time (S760-N), the display apparatus converts the mode of the display apparatus into the standby mode (S780). That is, when the power on signal is not received within the predetermined time, the display apparatus determines that the user will not use the display apparatus and converts the mode of the display apparatus into the standby mode in order to prevent unnecessary power consumption.

Figure 8:
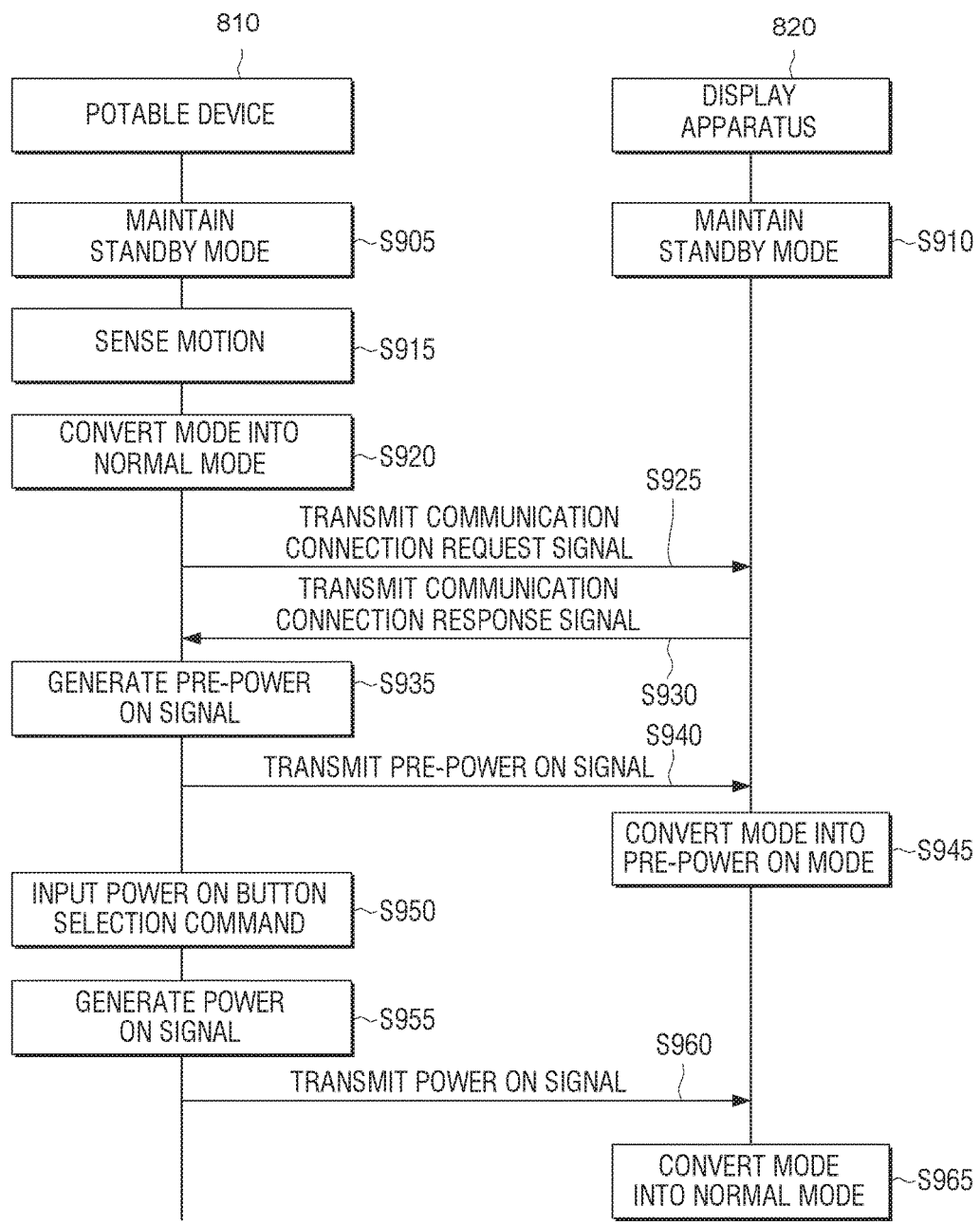
FIGS. 8 to 9 are sequence diagrams illustrating methods for controlling power of a display apparatus of a display system according to one or more exemplary embodiments.

FIG. 8 is a sequence diagram to illustrate a method for controlling power of a display apparatus of a display system according to an exemplary embodiment.

In the exemplary embodiment of FIG. 8, a display apparatus 820 and a portable device 810 communicate with each other using a Bluetooth communication method. In the present exemplary embodiment, the display apparatus 820 and the portable device 910 performs a pairing operation beforehand.

First, the portable device 810 and the display apparatus 820 each maintain a standby mode (S905 and S910). The standby mode of the portable device 810 may be a mode in which only a motion sensor is activated, and the standby mode of the display apparatus 820 may be a mode in which only a communicator is activated.

Also, the portable device 810 senses a movement of the remote controller (S915). Specifically, the portable device 810 may sense the movement of the portable device 910 using at least one motion sensor.

The portable device 810 converts the mode of the portable device 910 into a normal mode (S920). The normal mode of the portable device 810 is a mode in which all elements of the portable device 910 are activated.

The portable device 810 transmits a communication connection request signal to the display apparatus 820 (S925), and the display apparatus 820 transmits a communication connection response signal to the portable device 810 (S930). Accordingly, the portable device 810 and the display apparatus 820 communicate with each other.

The portable device 810 generates a pre-power on signal (S935) and transmits the pre-power on signal to the display apparatus 820 (S940).

The display apparatus 820 converts the mode of the display apparatus into a pre-power on mode (S945). The pre-power on mode is a mode in which some elements of the display apparatus 820 (for example, a controller, etc.) are activated. When the mode of the display apparatus 820 is converted into the pre-power on mode, the display apparatus 820 may output an indicator informing that the current mode of the display apparatus 820 is the pre-power on mode.

After the mode of the display apparatus 820 is converted into the pre-power on mode, the portable device 810 receives a power on button selection command (S950).

The portable device 810 generates a power on signal (S955) and transmits the power on signal to the display apparatus 820 (S960).

When the power on signal is received, the display apparatus 820 converts the mode of the display apparatus 820 into a normal mode (S965). The normal mode of the display apparatus 820 refers to a state in which all elements of the display apparatus 820 are activated.

As described above in FIG. 8, when the portable device 100 transmits the pre-power on mode using the Bluetooth communication method, the transmission accuracy may be increased in comparison with the IR communication method. Specifically, because the IR communication has directionality, when the portable device 100 communicating in the IR communication method is not directed toward the display apparatus 820, smooth communication may not be achieved. Accordingly, when the pre-power on signal is transmitted in the Bluetooth communication method, the possibility that the pre-power on signal is not transmitted is lower than in the IR communication method.

Figure 9:
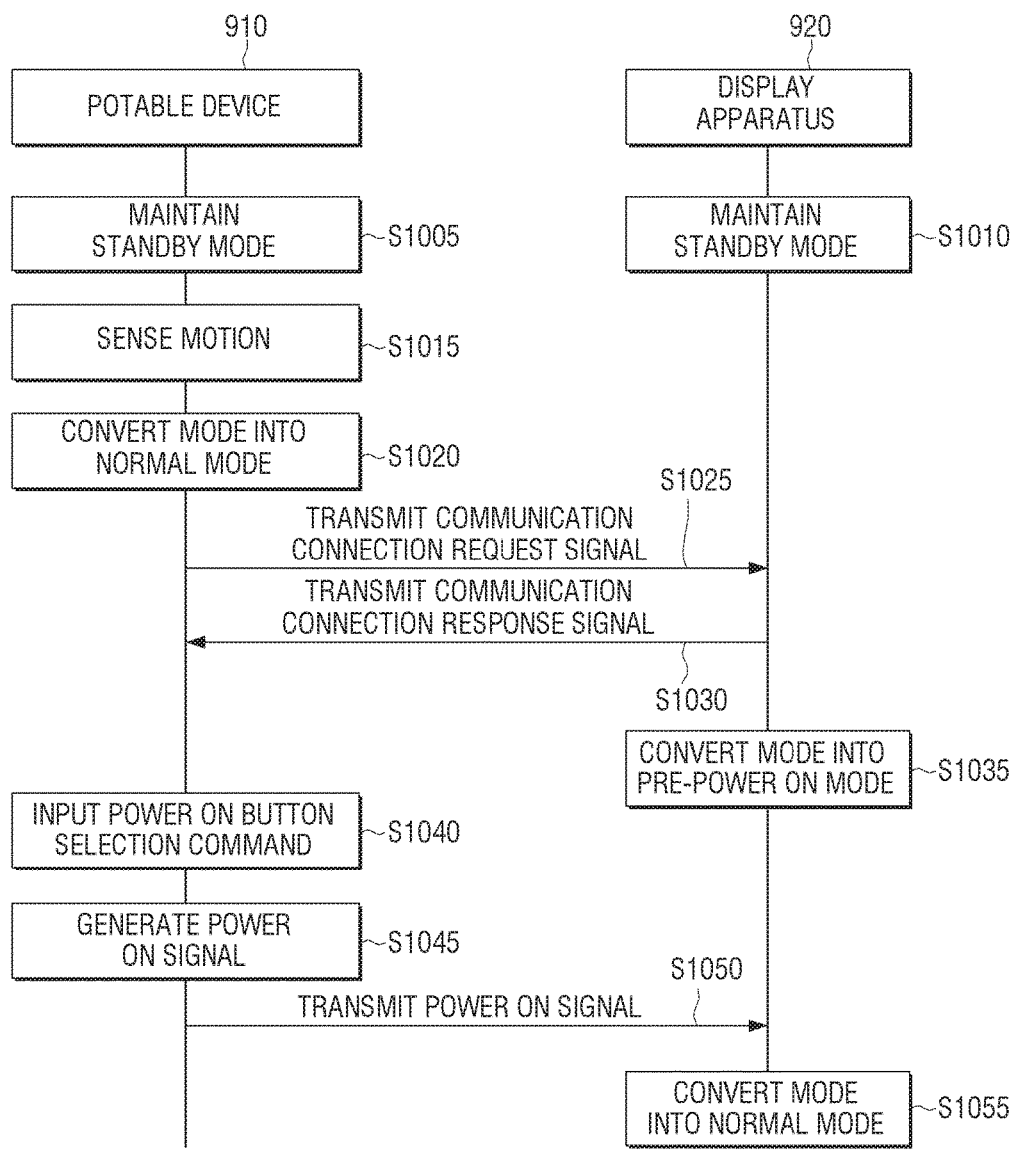

FIG. 9 is a sequence diagram to illustrate a method for controlling power of a display apparatus of a display system according to another exemplary embodiment. In the exemplary embodiment of FIG. 9, a display apparatus 920 and a portable device 910 communicate with each other using the Bluetooth communication method. Also, in the present exemplary embodiment, the display apparatus 920 and the portable device 910 performs a pairing operation beforehand.

First, the portable device 910 and the display apparatus 920 each maintain a standby mode (S1005 and S1010). The standby mode of the portable device 910 may be a mode in which only a motion sensor is activated, and the standby mode of the display apparatus 920 may be a mode in which only a communicator is activated.

The portable device 910 senses a movement of the portable device 910(S1015). Specifically, the portable device 910 may sense the movement of the portable device 910 using at least one motion sensor.

Also, the portable device 910 converts the mode of the portable device 910 into a normal mode (S1020). The normal mode of the portable device 910 is a mode in which all elements of the portable device 910 are activated.

The portable device 910 transmits a communication connection request signal to the display apparatus 920(S1025), and the display apparatus 920 transmits a communication connection response signal to the portable device 910 (S1030). Accordingly, the portable device 910 and the display apparatus 920 communicate with each other.

In particular, the display apparatus 920 converts the mode into a pre-power on mode in response to the communication connection request signal (S1035). That is, when the communication connection request signal is received without receiving a separate pre-power on signal, the display apparatus 920 may convert the mode of the display apparatus 920 into the pre-power on mode. When the mode of the display apparatus 920 is converted into the pre-power on mode, the display apparatus 920 may output an indicator informing that the current mode of the display apparatus 920 is the pre-power on mode.

After the mode of the display apparatus 920 is converted into the pre-power on mode, the portable device 910 receives a power on button selection command (S1040).

The portable device 910 generates a power on signal (S1045) and transmits the power on signal to the display apparatus 920 (S1050).

When the power on signal is received, the display apparatus 920 converts the mode of the display apparatus 920 into a normal mode (S1055). The normal mode of the display apparatus 920 refers to a state in which all elements of the display apparatus 920 are activated.

As explained in FIG. 9, when the portable device 910 transmits the pre-power on mode using the Bluetooth communication method, the transmission accuracy may be increased in comparison with the IR communication method. Also, because the mode of the display apparatus 920 is directly converted into the pre-power on mode in response to the communication connection request signal, the portable device 910 is not required to generate and transmit the pre-power on signal and thus the display apparatus 920 can be booted more quickly.

Figure 10:
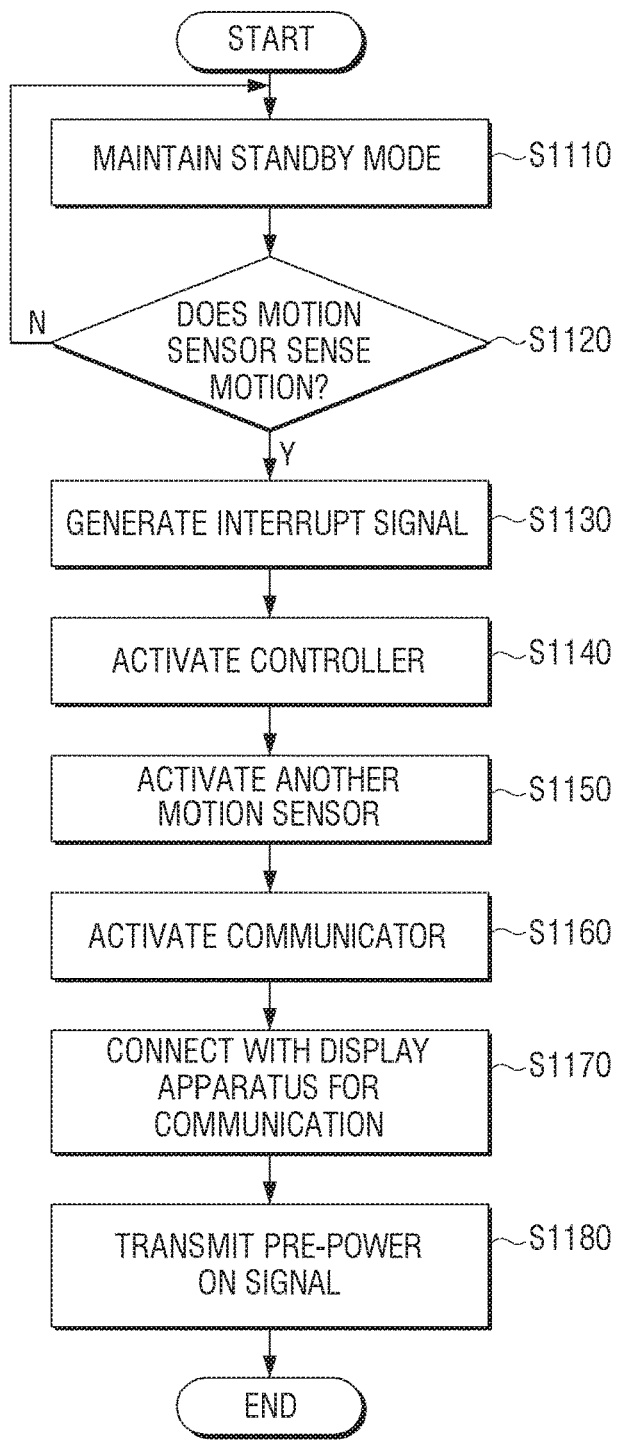
FIG. 10 is a flow chart illustrating a method for controlling a power of a display apparatus, according to another exemplary embodiment.

FIG. 10 is a flow chart to explain a method for controlling power of the display apparatus of a portable device, according to another exemplary embodiment.

First, the portable device maintains a standby mode (S1110). Specifically, when there is no movement in or by the remote controller for a predetermined time, the portable device sets a mode to the standby mode and maintains the standby mode. The standby mode of the portable device refers to a state in which only some of the motion sensors (for example, an acceleration sensor) are activated and the other elements are inactivated.

While maintaining the standby mode, the portable device may sense a movement of the portable device (S1120). Specifically, the portable device may sense the movement of the portable device using the activated motion sensor.

When the movement of the portable device is sensed (S1120-Y), the activated motion sensor generates an interrupt signal (S1130). The interrupt signal is a signal for activating the elements of the portable device and the activated motion sensor transmits the interrupt signal to a controller.

The controller, the other motion sensors which are inactivated, and a communicator are activated by the interrupt signal, respectively (S1140, S1150, and S1160). The activated motion sensor may generate the interrupt signal and transmit the interrupt signal to the controller, the other motion sensors which are inactivated, and the communicator. However, this is merely an example. The activated motion sensor may generate the interrupt signal and transmit the interrupt signal to the controller. The controller may activate the other motion sensors which are inactivated and the communicator. The communicator may be implemented by using a Bluetooth module.

When the communicator is activated, the portable device may be connected with a display apparatus for communication (S1170). At this time, the portable device may be connected with the display apparatus for communication through the Bluetooth module.

The portable device transmits a pre-power on signal to the display apparatus (S1180). Specifically, the portable device may transmit the pre-power on signal to the display apparatus through the Bluetooth module.

A program code to perform the method for controlling the power of the display apparatus according to the above-described exemplary embodiments may be stored in various kinds of recording media. Specifically, the program code may be stored in various kinds of recording media readable by a terminal, such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, and a CD-ROM.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a communicator;
   a display; and
   a controller configured to:
   based on a first signal corresponding to a connection request being received from a remote controller through the communicator while the display apparatus is in a standby mode, perform a communication connection with the remote controller,
   based on a second signal corresponding to a pre-power on being received from the remote controller through the communicator while the display apparatus is in the standby mode, switch from the standby mode to a pre-power on mode to activate some elements of the display apparatus, and
   based on a power on signal being received from the remote controller through the communicator while the display apparatus is in the pre-power on mode, switch from the pre-power on mode to a normal mode to activate other elements of the display apparatus.

2. The display apparatus of claim 1, wherein the remote controller configured to operate in:
   a remote standby mode wherein a sensor is active, and wherein the remote standby mode is triggered in response to passing of an idle time limit corresponding to the sensor being idle; and
   a remote normal mode wherein the remote controller is completely active, and wherein the remote normal mode is triggered in response to the sensor receiving an input.

3. The display apparatus of claim 2, wherein the display apparatus is at least one of a television, a computer monitor, and a projector.

4. The display apparatus of claim 1, wherein the controller is further configured to convert from the pre-power on mode to the standby mode based on the power on signal not being received for a predetermined time.

5. The display apparatus of claim 4, wherein the controller is further configured to identify a number of times conversion from the pre-power on mode to the standby mode is repeated.

6. The display apparatus of claim 5, wherein the controller is further configured to inactivate the pre-power on mode based on the number of times conversion from the pre-power on mode to the standby mode being repeated a predetermined number of times.

7. The display apparatus of claim 1, wherein the controller is further configured to control the display apparatus to output an indicator based on the display apparatus operating in the pre-power on mode.

8. The display apparatus of claim 7, further comprising a light emitting diode,
   wherein the controller is further configured to control the display apparatus to output the indicator by illuminating the light emitting diode.

9. The display apparatus of claim 7, further comprising an audio output interface,
   wherein the controller is further configured to control the display apparatus to output the indicator by controlling the audio output interface to generate a sound.

10. The display apparatus of claim 7, wherein the controller is further configured to control the display apparatus to output the indicator by controlling the communicator to transmit an indication signal to the remote controller,
    wherein the indication signal causes the remote controller to vibrate.

11. A method of controlling a display apparatus, the method comprising:

receiving a first signal corresponding to a connection request from a remote controller while the display apparatus is in a standby mode;

performing a communication connection with the remote controller;

receiving a second signal corresponding to a pre-power on from the remote controller while the display apparatus is in the standby mode;

switching from the standby mode to a pre-power on mode to activate some elements of the display apparatus;

receiving a power on signal from the remote controller while the display apparatus is in the pre-power on mode, switching from the pre-power on mode to a normal mode to activate other elements of the display apparatus.

12. The method of claim 9, further comprising:
detecting, at the remote controller, a pre-selection event and generating the pre-power on signal based on the pre-selection event; and
detecting, at the remote controller, a selection event and generating the power on signal based on the selection event.

13. The method of claim 12, further comprising:
partially deactivating the display apparatus after a first idle time limit has passed; and
partially deactivating the remote controller after a second idle time limit has passed.

14. The method of claim 12, wherein the pre-selection event is at least one from a group consisting of:
detecting, using a motion sensor of the remote controller, a movement of the remote controller;
detecting, using a camera, a user motion or position;
detecting, using a microphone, a user vocalized command;
detecting a user proximity using near field communication; and
detecting a set programming.

15. The method of claim 12, wherein the selection event is at least one from a group consisting of:
detecting a selection of a button on the remote controller;
detecting, using a motion sensor of the remote controller, a movement of the remote controller;
detecting, using a camera, a user motion or position;
detecting, using a microphone, a user vocalized command;
detecting a user proximity using near field communication; and
detecting a set programming.

16. A non-transitory computer-readable recording medium having recorded thereon a program, which when executed by a processor, performs a method of controlling a display apparatus, the method including:
receiving a first signal corresponding to a connection request from a remote controller while the display apparatus is in a standby mode;
performing a communication connection with the remote controller;
receiving a second signal corresponding to a pre-power on from the remote controller while the display apparatus is in the standby mode;
switching from the standby mode to a pre-power on mode to activate some elements of the display apparatus;
receiving a power on signal from the remote controller while the display apparatus is in the pre-power on mode,
switching from the pre-power on mode to a normal mode to activate other elements of the display apparatus.

* * * * *